United States Patent
McPeek

(10) Patent No.: US 6,576,284 B1
(45) Date of Patent: Jun. 10, 2003

(54) TOMATO-BASED CARAMELIZED SAUCE AND PROCESS FOR MAKING SAME

(76) Inventor: Ruth Ann McPeek, 3153 S. Custer Rd., Monroe, MI (US) 48161

( * ) Notice: Subject to any disclaimer, the term of this patent is extended or adjusted under 35 U.S.C. 154(b) by 244 days.

(21) Appl. No.: 09/842,680

(22) Filed: Apr. 27, 2001

(51) Int. Cl.⁷ .................................................. A23L 1/39
(52) U.S. Cl. ..................................................... 426/589
(58) Field of Search ................................. 426/589, 638, 426/639, 615, 650, 599

(56) References Cited

PUBLICATIONS

"Complete Guide to Home Canning, Preserving and Freezing", U.S. Dept. of Agriculture. Jan. 1994, Dover Publications. pp. 74, 79 and 82–84.*

Street, Myra. "The Encyclopedia of Homemade Preserves". Jan. 1996. Courage Books, Pub. pp. 63, 80.*

* cited by examiner

*Primary Examiner*—Keith Hendricks
(74) *Attorney, Agent, or Firm*—Greenblum & Bernstein, P.L.C.

(57) ABSTRACT

A tomato-based sauce and a process for making such sauce. The sauce of the invention is primarily intended as a pasta sauce, which has a unique texture and taste. The preparation of the sauce includes the inclusion of a substantial quantity of sugar. The components of the sauce are cooked at a low temperature for approximately two hours to caramelize the sugar, producing a uniquely textured and flavored character.

19 Claims, No Drawings

TOMATO-BASED CARAMELIZED SAUCE AND PROCESS FOR MAKING SAME

BACKGROUND OF THE INVENTION

1. Field of the Invention

The present invention relates generally to a tomato-based sauce and a process for making such sauce. More particularly, the invention is related to a sauce which includes a caramelization of a substantial amount of sugar, the sugar being an additive to the sauce, as well as a caramelization of sugars which are additional components of the sauce.

2. Description of Background and Relevant Information

Tomato-based sauces, particularly sauces for spaghetti and other sauces, are popular items in the diets of many people and many families. Conventionally, the modern consumer utilizes ready-made products of one of the major food-product companies when preparing the evening meal of spaghetti and spaghetti sauce. The sauce is emptied into a sauce pan, heated and then served with the cooked spaghetti.

What the ready-made products offer in terms of convenience they typically lack in flavor. It is known that the processing necessary for providing an adequate shelf-life for such sauces, such as treatment at high temperatures, serve to degrade their flavor, texture, and color, for example.

Attempts to improve the appeal of such ready-made products have led to the development of lines of pasta sauces within brands. Such lines include name's as such "roasted garlic," "roasted peppers and garlic," "sun-dried tomato," "marinara and burgundy wine," and even "Florentine spinach and cheese."

Home-made pasta sauces can require somewhat more time for a typical consumer to make and they can be somewhat more flavorful than the ready-made type, particularly when fresh ingredients are used. Nevertheless, there remains a need for a pasta sauce that is flavorful and is different from pasta sauces that are presently known.

It is known that known pasta sauces include a variety of different additives, such as different spices, to affect the flavor of the resultant sauce. Known pasta sauces have flavors in which certain constituents dominate, i.e., sauces have flavors domiminated by the taste of salt, garlic, oregano, or tomato. In general, however, known pasta sauces have a generally predictable texture and taste.

DESCRIPTION OF THE INVENTION

It is an object of the invention to provide a tomato-based sauce, particularly such a sauce intended for pasta, which has a unique texture and taste.

More particularly, the tomato-based sauce of the invention includes a substantial amount of sugar, which adds a sweet taste and which enables a caramelization during the preparation of a tomato-based sauce. Whereas a small amount of sugar is known to be added in pasta sauce, it is known to be used for the purpose of balancing the acid content of the tomato. In a typical quantity of sauce to be made for a meal, anywhere from a pinch to a teaspoon or two of sugar is added for this purpose.

In a preferred embodiment of the sauce of the invention, a quantity of meat, such as lean ground beef or turkey, is included.

In that embodiment, which produces about six quarts of sauce and can serve about 20 people, three pounds of lean ground beef or turkey is browned and drained. To the browned meat, a large onion is then chopped and added. Then about 28 ounces of tomato sauce and 12 ounces of tomato paste are added. The components thus far are then mixed well. To that mixture, the following components are added: about two tablespoons of garlic salt, about two tablespoons of crushed garlic, about two tablespoons of oregano, one bay leaf, and about one to one-and-a-half cups of sugar.

It is contemplated that, while maintaining the quantity of about one to one-and-a half cups of sugar, that the amount of tomato sauce could vary from about 12 ounces to about 36 ounces and that the amount of tomato paste could vary from about 6 ounces to about 18 ounces. Thereby, the total combined amounts of tomato sauce and tomato paste could vary from about 18 ounces to about 54 ounces.

The components are then heated at a low temperature, sometimes referred to as a simmer, for about two hours. The pasta sauce thus prepared has a sweet, garlic taste. The substantial amount of sugar adds a unique character to the sauce. The sauce has a unique flavor and texture by virtue of the sugar, the sugar having been caramelized during the long, slow simmering.

I claim:

1. A tomato-based caramelized sauce comprising:
   a quantity of tomato sauce and/or paste in a range of about 18 ounces to about 54 ounces; and
   a quantity of caramelized sugar in a range of about one to about one-and-a-half cups.

2. A tomato-based sauce according to claim 1, wherein:
   said quantity of tomato sauce and/or paste comprises about 40 ounces.

3. A tomato-based sauce according to claim 2, wherein:
   said quantity of tomato sauce and/or paste comprises about 28 ounces of tomato sauce and about 12 ounces of tomato paste.

4. A tomato-based sauce according to claim 1, further comprising:
   a quantity of flavorings.

5. A tomato-based sauce according to claim 4, wherein:
   said quantity of flavorings comprises at least one of the following flavorings: an onion, garlic salt, crushed garlic, oregano, or bay leaf.

6. A tomato-based sauce according to claim 4, wherein:
   said quantity of flavorings comprise a large onion, about two tablespoons of garlic salt, about two tablespoons of crushed garlic, about two tablespoons of oregano, and one bay leaf.

7. A tomato-based sauce according to claim 4, wherein:
   said quantity of flavorings comprise about three pounds of meat.

8. A tomato-based caramelized sauce comprising:
   about 28 ounces of tomato sauce;
   about 12 ounces of tomato paste;
   a large chopped onion;
   about two tablesoons of garlic salt;
   about two tablespoons of oregano;
   about two tablespoons of crushed garlic;
   one-and-a-half cups of caramelized sugar;
   one bay leaf;
   about three pounds of browned beef or turkey.

9. A process for making a tomato-based caramelized sauce comprising:
   combining an amount of tomato sauce and/or tomato paste, in a range of about 18 ounces to about 54 ounces, with an amount of sugar in a range of about one to about one-and-a-half cups to form a mixture;

heating said mixture at a simmer for approximately two hours.

10. A process for making a tomato-based sauce according to claim 9, wherein:

said amount of tomato sauce and/or tomato paste comprises about 40 ounces.

11. A process for making a tomato-based sauce according to claim 10, wherein:

said 40 ounces of tomato sauce and/or tomato paste comprises about 28 ounces of tomato sauce and about 12 ounces of tomato paste.

12. A process for making a tomato-based sauce according to claim 9, further comprising:

chopping and adding an onion to said mixture.

13. A process for making a tomato-based sauce according to claim 12, further comprising:

browning about three pounds of ground beef or turkey and adding to said mixture.

14. A process for making a tomato-based sauce according to claim 9, further comprising:

adding a quantity of flavorings to said mixture.

15. A process for making a tomato-based sauce according to claim 14, wherein:

said quantity of flavorings comprises at least one of the following flavorings: an onion, garlic salt, crushed garlic, oregano, bay leaf.

16. A process for making a tomato-based sauce according to claim 14, wherein:

said quantity of flavorings comprise a large onion, about two tablespoons of garlic salt, about two tablespoons of crushed garlic, about two tablespoons of oregano, and one bay leaf.

17. A process for making a tomato-based caramelized sauce comprising:

browning about three pounds of ground beef or turkey;

adding about 28 ounces of tomato sauce, about 12 ounces of tomato paste, and a large chopped onion to the three pounds of ground beef or turkey and mixing to form a mixture;

adding the following components to the mixture:
about two tablespoons of garlic salt;
about two tablespoons of oregano;
about two tablespoons of crushed garlic;
one-and-a-half cups of sugar;
one bay leaf;

simmering the mixture and additional components at a low heat for about two hours.

18. A tomato-based carmelized sauce comprising:

a quantity of tomato sauce and/or paste and a quantity of caramelized sugar;

said quantity of tomato sauce and/or paste and said quantity of sugar comprising a proportion of about one to about one-and-a-half cups of caramelized sugar to about 18 to about 54 ounces of tomato sauce and/or paste.

19. A process for making a tomato-based caramelized sauce comprising:

combining an amount of tomato sauce and/or tomato paste with an amount of sugar to form a mixture in a proportion of about one to about one-and-a-half cups of sugar to about 18 ounces to about 54 ounces of tomato sauce and/or tomato paste;

heating said mixture at a simmer for approximately two hours.

* * * * *